United States Patent [19]

Moschet

[11] Patent Number: 5,071,169

[45] Date of Patent: Dec. 10, 1991

[54] TUBE COUPLING HOLDER

[75] Inventor: Garry R. Moschet, Livonia, Mich.

[73] Assignee: Ford Motor Company, Dearborn, Mich.

[21] Appl. No.: 577,729

[22] Filed: Sep. 4, 1990

[51] Int. Cl.$^5$ ............................. F16L 3/10; F16L 3/22
[52] U.S. Cl. ............................. 285/62; 285/137.1; 285/158; 285/921; 248/68.1
[58] Field of Search ............ 285/24, 25, 28, 62, 285/131, 137.1, 137.2, 330, 49, 61, 63, 64, 158; 248/68.1, 65, 74.1

[56] References Cited

U.S. PATENT DOCUMENTS

| | | | |
|---|---|---|---|
| 159,136 | 1/1875 | Adgate . | |
| 2,385,777 | 10/1943 | Ebert | 85/32 |
| 2,469,441 | 3/1945 | Pitisci | 151/54 |
| 3,008,554 | 2/1958 | Hodgson | 189/36 |
| 3,319,691 | 5/1967 | Fisher | 151/41.74 |
| 3,469,863 | 9/1969 | Riester et al. | 285/137.1 |
| 3,936,078 | 2/1976 | Wallyn | 285/330 X |
| 3,999,784 | 12/1976 | Kennedy, Jr. | 285/62 |
| 4,007,952 | 2/1977 | Fiddler | 285/137.1 |
| 4,346,734 | 8/1982 | Frank | 137/506 |
| 4,462,710 | 7/1984 | Leitner | 403/21 |
| 4,737,057 | 4/1988 | Olsson | 411/92 |
| 4,753,560 | 6/1988 | Ryder | 411/82 |
| 4,878,696 | 11/1989 | Walker | 285/61 |

OTHER PUBLICATIONS

Guide for Patent Draftsmen, U.S. Department of Commerce, 1989, p. 18.

*Primary Examiner*—Randolph A. Reese
*Assistant Examiner*—Tim Aberle
*Attorney, Agent, or Firm*—Raymond L. Coppiellie; Roger L. May

[57] ABSTRACT

An assembly for preventing rotation of a fastener nut comprises a retaining block having at least one aperture therein, the aperture having a longitudinal axis and including nut retaining device therein for preventing rotation of the nut in the aperture. The assembly further includes a retaining member adapted to releasably engage the retaining block for preventing axial movement of the nut in a direction generally parallel with the longitudinal axis of the aperture. In one embodiment, the retaining member is a generally U-shaped member having a pair of legs including a tab on each of the legs for releasably engaging a pair of slots formed on opposing faces of the retaining block. In a second embodiment the retaining block includes a pair of tabs projecting from opposing faces thereof. The retaining member of this embodiment includes a pair of legs extending generally perpendicularly from a generally planar web, each one of the legs having an aperture therein for mating engagement with the tab projecting from the retaining block. Furthermore, each of the legs includes a turned-over edge disposed at an end opposite of the web for engagement with a fixed structure for securing the assembly to the fixed structure.

23 Claims, 3 Drawing Sheets

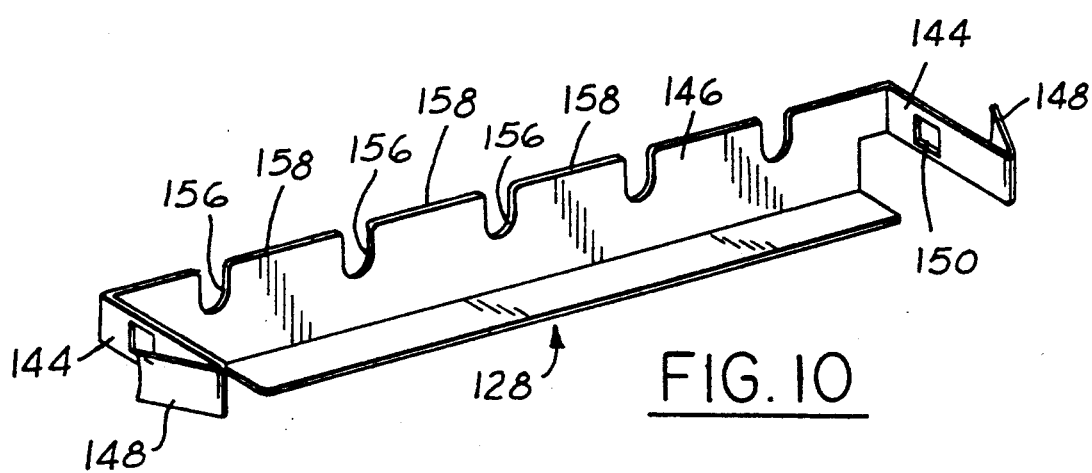

TUBE COUPLING HOLDER

BACKGROUND OF THE INVENTION

1. Field of the Invention

The present invention relates generally to fastening devices. More particularly, the present rotational and axial movement of a tube coupling during tightening or loosening of the coupling.

2. Disclosure Information

In certain manufacturing processes, such as in the automotive or aircraft industries, it is often necessary to fasten together tubes carrying hydraulic fluid or the like. The tube ends are connected by a coupling of known construction having a threaded male fitting rotatably secured to one end of the tube which matingly engages a female fitting rotatably secured to one end of the second tube. The female fitting typically is configured as a nut having internal threads which receive the threaded portion of the male fitting. To tighten the coupling, the operator must employ two hand tools, one for each fitting, to hold one fitting against rotation while tightening the other fitting into the held fitting. Although the use of two hand tools to tighten the coupling is adequate for single applications of joining two tube ends together, it is difficult to quickly join a plurality of tubes together as is often necessary in the automotive industry Furthermore, kinking of one or both tubes frequently occurs with the use of two hand tools since the operator is unable to support the tubing during tightening of the coupling. Therefore, there is a need for an assembly which prevents rotation of one of the fittings during tightening of the coupling without the need for the use of two hand tools by an operator.

Various nut holders and like devices have been proposed which prevent rotation of a nut while a threaded fastener is being screwed into the nut. For example, U.S. Pat. Nos. 159,136; 2,385,777; 2,469,441; 3,008,554; 3,319,691; 4,462,710; 4,737,057; and 4,753,560 all propose devices which prevent rotation of a nut while two workpieces are being secured together. Each of the proposed devices relies on one of the workpieces to hold the nut against axial movement. However, these devices are not desirable for use in joining tubing together since the tubing provides no area for preventing axial movement of the coupling during tightening.

U.S. Pat. No. 4,346,734 discloses a locking device which prevent rotation of a pair of hex-shaped relief valves having tubes associated therewith. The locking device is a thin metal plate having an elongate opening for receiving the valves therethrough. The locking device prevents rotation of the valves due to vibration but does not prevent axial movement of the valves upon tightening.

It is a feature of the present invention to provide an assembly which prevents rotational and axial movement of one fitting of a tube coupling during tightening or loosening of the coupling.

It is an object of the present invention to provide such an assembly comprising a retaining block having at least one aperture for receiving the coupling fittings therein and for preventing rotation of one of the fittings during tightening or loosening of the coupling.

It is a further object of the invention to provide such an assembly wherein axial movement of one of the fittings is prevented by means of a retaining member which is releasably secured to the retaining block in a snap fit relationship.

It is yet a further object of the invention that the retaining member also secures the assembly to the chassis of the vehicle.

These an other features and objects of the invention will be apparent from the drawings, description and claims which follow.

SUMMARY OF THE INVENTION

In accordance with the present invention, there is provided herein an assembly for preventing rotation of a fastener nut, the assembly comprising a retaining block having at least one aperture therein, the aperture having a longitudinal axis and including nut retaining means therein for preventing rotation of the nut in the aperture. The assembly further comprises a retaining member adapted to releasably engage the retaining block for preventing axial movement of a nut in one direction generally parallel with the longitudinal axis of the aperture. The retaining block also includes a shoulder disposed in the apertures for preventing axial movement of the nut in a second direction generally parallel to the longitudinal axis of the aperture. The nut retaining means of the retaining block comprises an interior surface of the aperture, the surface configured to engage to nut in a driving relationship.

In one embodiment of the present invention, the retaining block includes a pair of slots disposed on opposing faces of the block for receiving the retaining member therein in a snap-fit relationship. The retaining member comprises a generally U-shaped member having a pair of legs extending generally perpendicularly from a generally planar surface disposed between the legs. Each one of the legs includes a tab operative to fit into each one of the slots in the retaining block. The generally planar surface of the U-shaped member contacts the nut in the aperture to prevent axial movement of the nut in a direction generally parallel to the longitudinal axis of the aperture as discussed above. In this embodiment, the U-shaped member comprises an elastically deformable strip of synthetic polymeric material but may also be formed from a variety of other known materials.

In a second embodiment, the retaining block includes a pair of tabs projecting from opposing faces of the block for engagement with the retaining member. The retaining member of this embodiment includes the pair of legs, each one of the pair extending generally perpendicularly from a generally planar web disposed between the legs. Each of the legs includes a turned-over end disposed at an end of the leg opposite the web, the turned-over end being adapted to matingly engage a pair of apertures in the fixed fixture to which the retaining block is secured to thereby secure the retaining block to the structure. Each of the legs of this embodiment further includes an aperture disposed between the turned-over end the web for mating engagement with the tabs that project from the opposing faces of the retaining block.

The assembly according to the present invention further includes means for securing the block to the fixed structure, comprising either a threaded rod fastener or a tab projecting from a face of the block, the tab adapted to engage an aperture in the fixed structure to which the retaining block is secured. The assembly further includes a vibration isolation means, such as a rubber layer, disposed between the retaining block in the structure for limiting vibration of the retaining block.

An assembly of the present invention is disclosed for use with a tube coupling member for joining two tubes together. The coupling is of a known type having a male fitting and a female fitting. One of the fittings of the coupling engages the aperture of the retaining block in driving relationship to prevent rotation of that fitting while the second fitting is being matingly secured to the first fitting. In this manner, an operator can tighten or loosen a plurality of tube couplings very quickly and with only the need for one hand tool since the assembly of the present invention prevents rotational and axial movement of one of the coupling fittings.

BRIEF DESCRIPTION OF THE DRAWINGS

Reference will now be made to the following drawings in which:

FIG. 10 is a perspective view of a second retaining member for use with the assembly of FIG. 7.

DETAILED DESCRIPTION OF THE PREFERRED EMBODIMENTS

Figure 1:
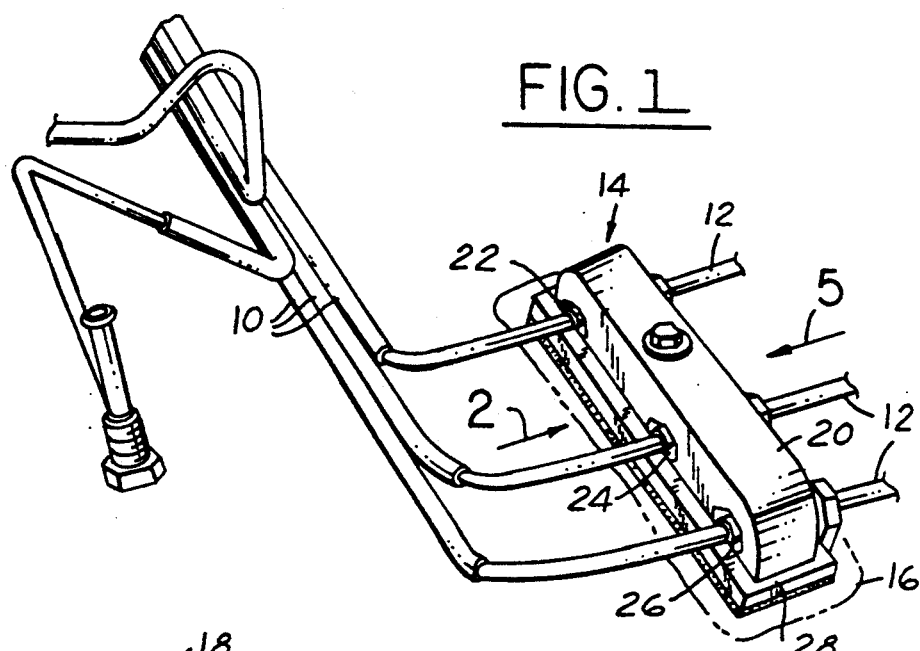
FIG. 1 is a perspective view of an assembly structured in accord with the principles of the present invention for use with a plurality of tubes.

Referring now to the drawings, FIG. 1 shows a perspective view of an assembly for preventing rotation of a fastener nut or fitting securing the ends of a pair of tubes 10, 12 together. The assembly 14 is secured to a fixed structure 16, such as the chassis of a vehicle, by means of a threaded rod fastener 18 projecting through a retaining block 20. Although shown for connecting together a plurality of tubes, the assembly 16 of the present invention may also be used in a variety of other processes where it is advantageous to hold one piece of a two-part fitting against rotational and axial movement to expedite the mating engagement of a second piece of the fitting. For example, an assembly 16 of the present invention may be used to secure any type of a nut disposed in the assembly while its mating threaded rod is either tightened or loosened in the nut. The use of the assembly 14 allows an operator to use only one hand tool to tighten a fitting thus freeing the other hand to support the workpiece to which the fitting is being secured. Also, by use of an assembly 14 of the present invention, an operator can join together a plurality of tubes such as is shown in FIG. 1 in a minimal amount of time without kinking or otherwise damaging the tubes.

Figure 5:
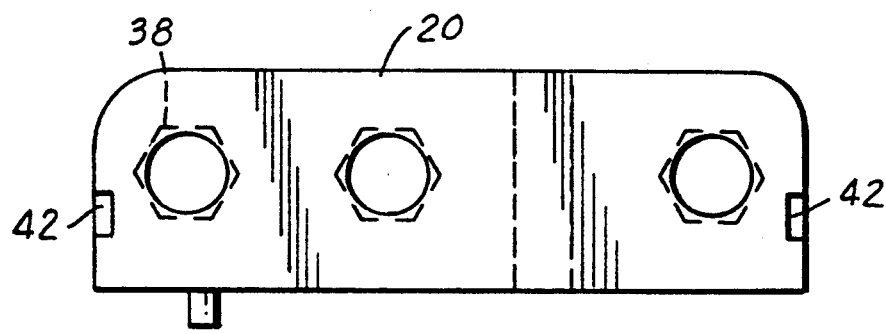
FIG. 5 is a side elevational view of the assembly of the present invention as shown by the arrow of FIG. 1.

The assembly 14 of the present invention includes a retaining block 20 and a retaining member 28 releasably engaging the retaining block 20. The retaining block may include a plurality of apertures 22, 24, 26 as shown in FIG. 1, the apertures having a longitudinal axis and including nut retaining means therein for preventing rotation of a nut in the aperture. As shown in FIG. 5, the nut retaining means comprises an interior surface 38 of the aperture configured to engage the nut in driving relationship As shown in FIG. 5, the interior surface 38 of the aperture is configured as a hexagon, although it should be apparent to those skilled in the art that various other configurations may suitably be used. The retaining block 20 of the present invention may be formed from a variety of materials including synthetic polymeric material such as thermo-plastic polyesters, ABS, or nylons in an injection-molding process. The number of apertures in a retaining block is a matter of design choice.

Figure 2:
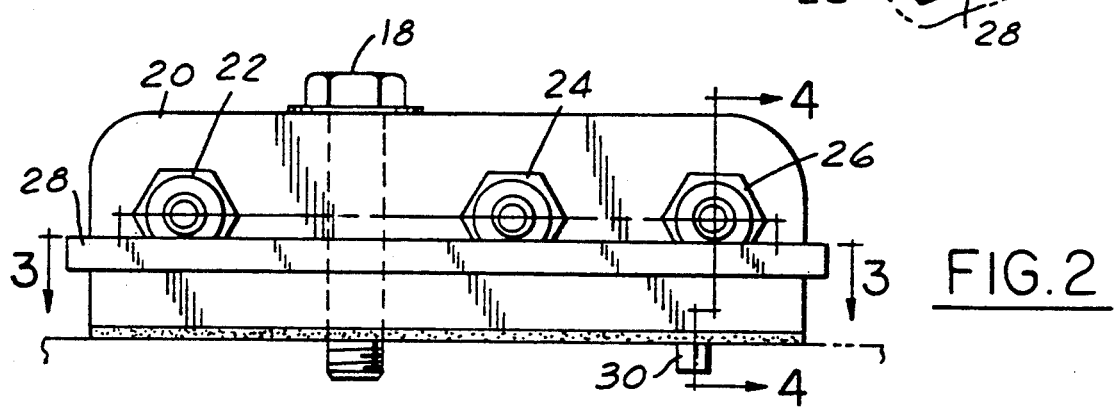
FIG. 2 is a side elevational view of the assembly of FIG. 1.
Figure 3:
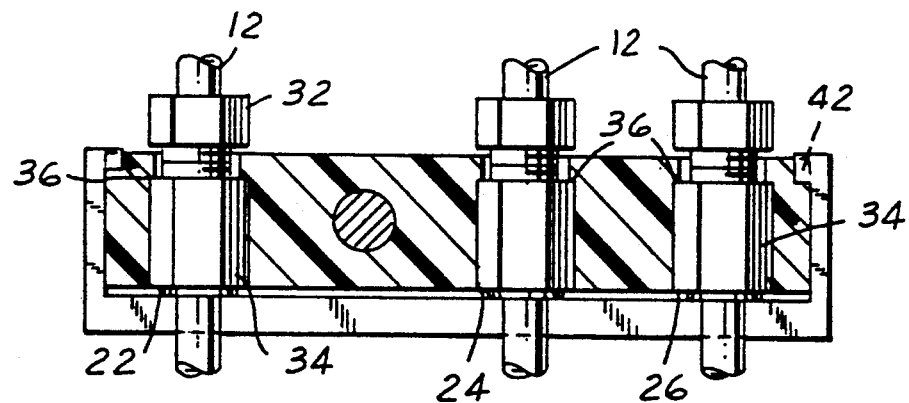
FIG. 3 is a cross-sectional view along line 3—3 of FIG. 2.
Figure 4:
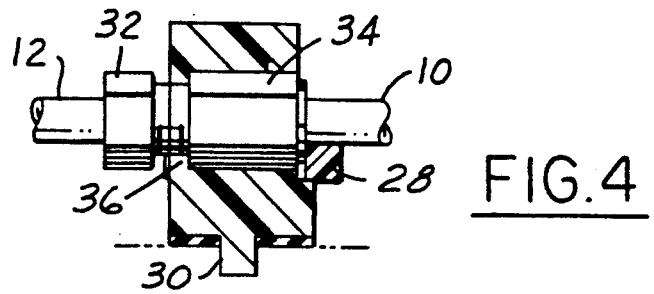
FIG. 4 is a cross-sectional view along line 4—4 of FIG. 2.

As shown in FIGS. 2-4, the assembly 14 is shown for use in securing the ends of a pair of tubes 10 to the ends of the plurality of second tubes 12. A standard tube coupling of known construction may be used with the present invention. The coupling includes a male fitting 32 matingly engaged in a female fitting 34. As shown in FIGS. 3 and 4, the female fitting is configured to engage the apertures 22-26 of the retaining block 20 in a driving relationship. The retaining block 20 prevents rotation of the female fittings 36 so that the male fittings 32 may be tightened or loosened without the need for two hand tools. In this manner, an operator simply puts the female fittings 34 into apertures 22-26, the fittings being held against rotation and the operator simply threads the male fittings into the female fittings with the use of a single tool. It should be readily apparent to those skilled in the art that the present invention may also be used in the reverse manner, wherein the male fitting is held in the retaining block against rotation while the female member is being threaded thereto. This can be accomplished by simply configuring the apertures 22-26 to conform to the exterior configuration of the male fitting. The present invention is not meant to be limited solely to an assembly for preventing rotation of a female fitting of a coupling member.

Figure 6:
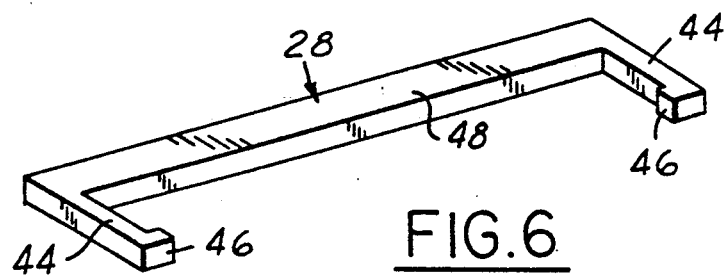
FIG. 6 is a perspective view of a retaining member of an assembly structured in accord with the principles of present invention.

FIG. 6 shows a perspective view of one embodiment of a retaining member 28 for preventing axial movement of one of the fittings in the aperture in a direction generally parallel with the longitudinal axis of the aperture. The retaining member of FIG. 6 comprises a generally U-shaped member 28 having a pair of legs 44 extending generally perpendicularly from a generally planar surface 48 disposed between the legs. Each of the legs 44 includes a tab 46 disposed at one end thereof. The retaining member 28 releasably engages retaining block 20 in a snap-fit relationship wherein the tabs 46 of the retaining block 28 engage slots 42 of retaining block 46 as can be seen more clearly in FIG. 3. The planar surface 48 of retaining member 28, contacts an exterior end of the female fittings 34 to prevent the fittings from axially moving out of the apertures in a direction generally parallel to the longitudinal axis of the apertures 22-26. Put another way, as the male fittings 32 are threaded into the female fittings 34, the female fittings 34 will not slide out of apertures 22-26 in an axial direction away from the male fittings 32 because of the contact of the retaining member 28 with the female fittings 34. This allows the operator to use his free hand to support the workpiece or the tubes 12, while the male fitting is being tightened or loosened from the coupling so that kinking or other damage to the tubing is prevented. As shown in FIG. 2, the retaining member 28 need cover only a portion of the fitting to prevent the axial movement of the fitting out of the apertures of the retaining block 20.

Each of the apertures 22-26 of retaining block 20 terminates in a shoulder 36. The shoulder 36 prevents axial movement of the female fittings 34 in the aperture in a second direction generally toward the male fittings 32. In this manner, the shoulder 36 and the retaining member 28 prevent axial movement of the fitting in both axial directions in the aperture retaining block 20.

Figure 7:
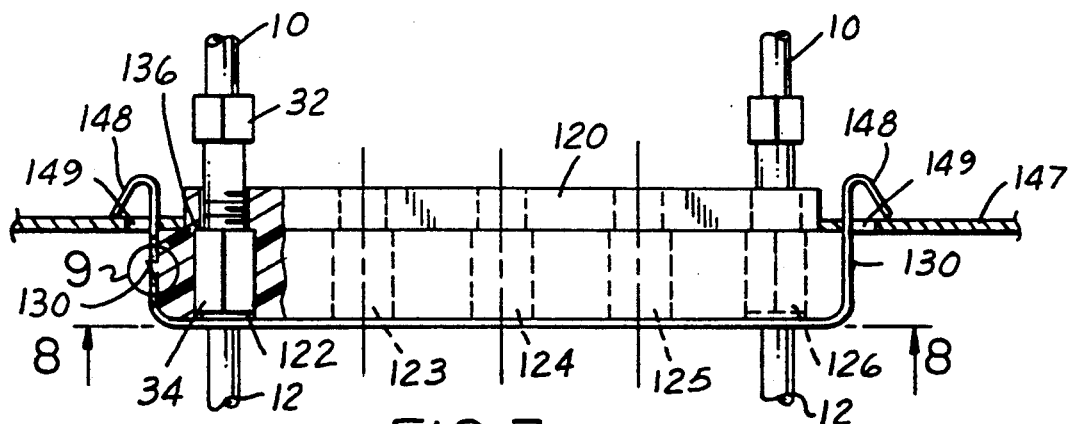
FIG. 7 is a side elevational view of a second embodiment of an assembly structured in accord with the principles of the present invention.
Figure 8:
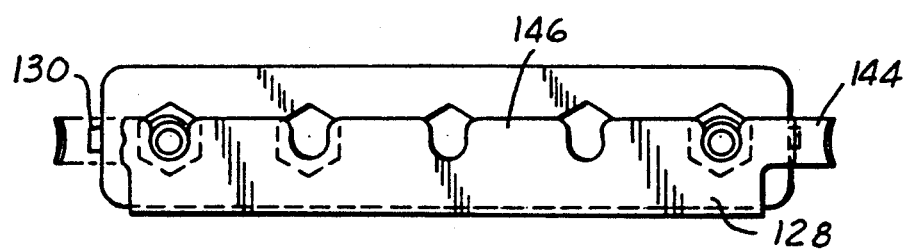
FIG. 8 is a bottom plan view of FIG. 7 of an assembly of the present invention.
Figure 9:
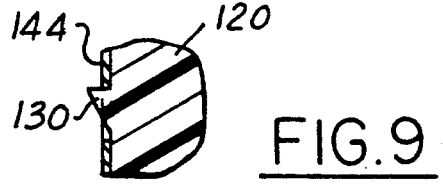
FIG. 9 is an enlarged view of a portion of FIG. 7.

FIGS. 7-10 show a second embodiment of the present invention structured generally as described above. As shown in FIGS. 7 and 8, this embodiment includes a retaining block 120 having a plurality of apertures 122-126 therein for receiving a fitting or a nut therein. The embodiment shown in FIGS. 7-10 may also be formed of a thermoplastic polyester materials or other synthetic polymeric materials in an injection molded process. The retaining block 120, as shown in FIGS. 7 and 8, includes a pair of tabs 130 projecting from opposing faces of the block 120. The tabs 130 engage a pair of apertures 150 of the retaining member 128 as shown in FIGS. 9 and 10. The retaining member 128 of this embodiment comprises a pair of legs 144 extending perpendicularly from a generally planar web 146. Each of the legs 144 includes a turned-over end 148 at the end of the leg opposite the web 146. The turned-over ends 148 matingly engage a pair of apertures 149 located in the body of the fixed structure 147 to which the retaining block is secured as shown in FIG. 7. For example, the chassis of an automobile may include a pair of apertures through which the turned-over ends project to hold the retaining block and the tubing associated with the apertures thereof securely to the vehicle. In this manner, the retaining member 128 prevents the axial movement of the fitting in the aperture in the same manner as described above and also provides a means for securing the assembly to the fixed structure. In the preferred embodiment, the retaining member 128 is stamped from a thin sheet of spring steel although it should be apparent to those skilled in the art that various other materials, such as synthetic polymeric materials may also be used.

As shown in FIG. 10, the retaining member 128 includes a web of material 146 having a Plurality of arcuate shaped apertures 156 therein. The apertures 156 allow the tubes to pass therethrough while the shoulders 158 defined between the arcuate shaped apertures 156 prevent the axial movement of the fitting in the apertures of the retaining block. As described above, the retaining block 120 further includes a shoulder 136 in each aperture for preventing axial movement of the fitting in the second direction within the aperture.

Referring back to FIGS. 1 and 2, both embodiments of the present invention may also include a vibration isolation means, such as rubber layer 25 interposed between the retaining block 20 and the fixed structure to which the block is secured. The rubber layer 25 prevents vibration and excessive noise of the assembly during operation of the workpiece or the vehicle. As shown in FIG. 2, the retaining block may further include an aperture or tab 50, projecting into an aperture located in the body of the fixed structure for securing the assembly to the fixed structure. Various other types of securing devices may be employed with the present invention to secure the retaining block to a fixed surface.

It should readily be apparent to those skilled in the art that many variations are possible within the scope of the present invention. Accordingly, the foregoing drawings, discussion and description are merely meant to be illustrative of particular embodiments of the invention and no limitations upon the practice thereof. It is the following claims, including all equivalents, which define the scope of the invention.

What is claimed is:

1. An assembly for preventing rotation of a nut comprising:
    a retaining block having at least one aperture therein, said aperture having a longitudinal axis and including nut retaining means therein for preventing rotation of said nut in said aperture; and
    a retaining member adapted to releasably engage said retaining block for preventing axial movement of said nut in one direction generally parallel with the longitudinal axis of said aperture, and wherein said retaining block further includes a pair of slots disposed on opposing faces thereof for receiving said retaining member therein in a snap-fit relationship.

2. An assembly according to claim 1, wherein said retaining block further includes at least one shoulder disposed in said at least one aperture for preventing axial movement of said nut in a second direction generally parallel to the longitudinal axis of said aperture.

3. An assembly according to claim 1, wherein said nut retaining means comprises an interior surface of said aperture configured to engage said nut in a driving relationship.

4. An assembly according to claim 1, wherein said retaining block further includes means for securing said block to a fixed structure.

5. An assembly according to claim 4, wherein said means for securing said retaining block to a fixed structure comprises a tab projecting from a face of said block, said tab adapted to matingly engage an aperture in said fixed structure.

6. An assembly according to claim 4, further including vibration isolation means disposed between said block and said structure for limiting to vibration of said retaining block.

7. An assembly according to claim 6, wherein said vibration isolation means comprises a rubber layer disposed between said retaining block and said structure.

8. An assembly according to claim 1, wherein said retaining member comprises an elastically deformable strip of synthetic polymeric material.

9. An assembly according to claim 1, wherein said retaining member is a generally U-shaped member having a pair of legs extending generally perpendicularly from a generally planar surface disposed between said legs, each one of said legs having a tab operative to fit into each one of said slots in said retaining block.

10. An assembly according to claim 1, wherein said retaining block further includes a pair of tabs, each one of said pair projecting from an opposing face of said block for engagement with said retaining member.

11. An assembly according to claim 10, wherein said retaining member includes a pair of legs, each one of said pair of legs extending generally perpendicularly to a generally planar web disposed between said legs, and each one of said pair of legs including a turned-over end disposed at an end opposite said web, said turned over end being adapted to matingly engage a pair of apertures in said fixed structure to secure said retaining block thereto.

12. An assembly according to claim 11, wherein each of said pair of legs further includes an aperture disposed between said turned over end and said web for mating engagement with one of said pair of tabs projecting from said retaining block.

13. An assembly for preventing rotation of a tube coupling fitting rotatably mounted to one end of a tube during the rotation of a mating coupling fitting rotatably mounted to one end of an additional tube, said assembly comprising:

a substantially rectangular retaining block having a longitudinal axis and a transverse axis, said block including at least one aperture having nut retaining means therein for preventing rotation of one of said fittings, said aperture having a longitudinal axis generally parallel with the longitudinal axis of said retaining block; and axial retaining means adapted to releasably engage said retaining block and operatively associated with said in said aperture in a direction generally parallel to the longitudinal axis of said aperture, and wherein said retaining block further includes a pair of slots disposed on opposing faces thereof for receiving said axial retaining means therein in a snap-fit relationship.

14. An assembly according to claim 13, wherein said axial retaining means comprises a U-shaped member operative to releasably engage said retaining block in a snap-fit relationship and prevent axial movement of a female fitting in said aperture in a direction away from a male fitting.

15. An assembly according to claim 14, wherein said axial retaining means further comprises a shoulder disposed in said aperture of said retaining block, said shoulder operative to contact said female fitting and prevent axial movement of said female fitting in a direction toward said male fitting.

16. An assembly according to claim 13, wherein said-retaining means comprises a pair of legs, each one of said pair of legs extending generally perpendicularly to a generally planar web disposed between said legs, and each one of said pair of legs including a turned-over end disposed at an end opposite said web, said turned over end being adapted to matingly engage a pair of apertures in said fixed structure to secure said retaining block thereto.

17. An assembly according to claim 16, wherein each of said pair of legs further includes an aperture disposed between said turned over end and said web for mating engagement with one of said pair of tabs projecting from said retaining block.

18. An assembly according to claim 13, wherein said retaining block further includes a pair of tabs, each one of said pair projecting from an opposing face of said block for releasable engagement with said, retaining means.

19. An assembly according to claim 13, wherein said nut retaining means comprises an interior surface of said aperture configured to engage said nut in a driving relationship.

20. An assembly according to claim 13, wherein said retaining block further includes means for securing said block to a fixed structure.

21. An assembly according to claim 20, wherein said means for securing said retaining block comprises a tab projecting from a face of said block, said tab adapted to matingly engage an aperture in said fixed structure.

22. An assembly for preventing rotation of a female fitting rotatably mounted to one end of a tube during the mating engagement of a male fitting rotatably mounted to one end of an additional tube to said female fitting, said assembly comprising:

a substantially rectangular retaining block block including at least one aperture having nut retaining means therein for preventing rotation of said female fitting, said aperture having a longitudinal axis generally parallel with the longitudinal axis of said retaining block, said blocks further including a pair of slots disposed on opposing faces thereof; and retaining means operatively associated with said retaining block for preventing axial movement of said female fitting in said aperture in a direction generally parallel to the longitudinal axis of said aperture, said retaining means comprising a U-shaped member operative to releasably engage said slots of said retaining block in a snap-fit relationship and prevent axial movement of said female fitting in said aperture in a direction away from said male fitting and further comprising a shoulder disposed in said aperture of said retaining block, said shoulder operative to contact said female fitting and prevent axial movement of said female fitting in a direction toward said male fitting.

23. An assembly for preventing rotation of a female fitting rotatably mounted to one end of a tube during the mating engagement of a male fitting rotatably mounted to one end of an additional tube to said female fitting, said assembly comprising:

a substantially rectangular retaining block having a longitudinally axis and a transverse axis, said block including a plurality of apertures having nut retaining means therein for preventing rotation of said female fitting, said aperture having a longitudinal axis generally parallel with the longitudinal axis of said retaining block and further including a pair of tabs, each of said pair projecting from opposing faces of said retaining block; and axial retaining means adapted to releasably engage said retaining block and operatively associated with said retaining block and operatively associated with said retaining block for preventing axial movement of said female fitting in said aperture in a direction generally parallel to the longitudinal axis of said aperture, said retaining means comprising a pair of legs, each one of said pair of legs extending generally perpendicularly to a generally planar web disposed between said legs, each one of said pair of legs including a turned-over end disposed at an end opposite said web, each of said turned over ends being adapted to matingly engage a respective one of a pair of apertures in said fixed structure to secure said retaining block thereto, and each of said pair of legs further including an aperture disposed between said turned over end and said web for mating engagement with one of said pair of tabs projecting from said retaining block.

* * * * *